United States Patent
Seiders, Jr.

(10) Patent No.: US 12,520,762 B2
(45) Date of Patent: Jan. 13, 2026

(54) SYSTEM AND METHOD FOR ADJUSTING THE POSITION OF A HARVESTING IMPLEMENT OF AN AGRICULTURAL HARVESTER

(71) Applicant: CNH Industrial America LLC, New Holland, PA (US)

(72) Inventor: Kenneth Seiders, Jr., Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 1147 days.

(21) Appl. No.: 17/347,752

(22) Filed: Jun. 15, 2021

(65) Prior Publication Data
US 2022/0394928 A1    Dec. 15, 2022

(51) Int. Cl.
*A01D 41/14*    (2006.01)

(52) U.S. Cl.
CPC ......... *A01D 41/145* (2013.01); *A01D 41/141* (2013.01)

(58) Field of Classification Search
CPC ..... A01D 41/16; A01D 41/141; A01D 41/145
See application file for complete search history.

(56) References Cited

U.S. PATENT DOCUMENTS

| | | | | |
|---|---|---|---|---|
| 4,776,153 A * | 10/1988 | DePauw | ............... | A01D 75/287 56/DIG. 15 |
| 5,155,984 A * | 10/1992 | Sheehan | ............... | A01D 41/141 56/DIG. 15 |
| 8,079,204 B2 | 12/2011 | Coers et al. | | |
| 9,730,375 B2 | 8/2017 | De Coninck | | |
| 2017/0311545 A1 * | 11/2017 | Walter | ................... | A01D 41/16 |
| 2019/0343048 A1 | 11/2019 | Farley et al. | | |
| 2020/0100422 A1 | 4/2020 | Schleicher et al. | | |
| 2021/0034867 A1 | 2/2021 | Ferrari et al. | | |
| 2021/0168991 A1 | 6/2021 | Dix et al. | | |

FOREIGN PATENT DOCUMENTS

| | | | | |
|---|---|---|---|---|
| CA | 2624556 A1 * | 9/2008 | ........... | A01D 41/141 |
| EP | 421042 B1 * | 4/1994 | ........... | A01D 41/16 |
| EP | 1721507 A1 * | 11/2006 | ........... | A01D 41/141 |
| EP | 3072382 A1 * | 9/2016 | ........... | A01B 63/004 |
| WO | 2020113058 A1 | 6/2020 | | |

OTHER PUBLICATIONS

Extended European Search Report for EP Application No. 22178632.0 dated Nov. 15, 2022 (five pages).

* cited by examiner

*Primary Examiner* — Joseph M Rocca
*Assistant Examiner* — Ashley A Kaercher
(74) *Attorney, Agent, or Firm* — Dority & Manning, P.A.

(57) ABSTRACT

An agricultural harvester includes a frame, a feeder coupled to the frame, and a harvesting implement coupled to the feeder. Furthermore, the agricultural harvester includes a first actuator including an extendible rod, with the first actuator coupled between one of the frame and the feeder or the feeder and the harvesting implement. Moreover, the agricultural harvester includes a second actuator including an extendible rod, with the second actuator coupled between the one of the frame and the feeder or the feeder and the harvesting implement such that an oblique angle is defined between the first and second actuators. In this respect, the rods of the first and second actuators are configured to be extended differing amounts such that harvesting implement is moved relative to the frame along two degrees of freedom.

18 Claims, 4 Drawing Sheets

SYSTEM AND METHOD FOR ADJUSTING THE POSITION OF A HARVESTING IMPLEMENT OF AN AGRICULTURAL HARVESTER

FIELD OF THE INVENTION

The present disclosure generally relates to agricultural harvesters and, more particularly, to systems and methods for adjusting the position of a harvesting implement of an agricultural harvester.

BACKGROUND OF THE INVENTION

A harvester is an agricultural machine used to harvest and process crops. For instance, a combine harvester may be used to harvest grain crops, such as wheat, oats, rye, barley, corn, soybeans, and flax or linseed. In general, the objective is to complete several processes, which traditionally were distinct, in one pass of the machine over a portion of the field. In this respect, most harvesters are equipped with a detachable header or harvesting implement, which cuts and collects the crop from the field. The harvester also includes a crop processing system, which performs various processing operations (e.g., threshing, separating, etc.) on the harvested crop received from the harvesting implement. Furthermore, the harvester includes a crop tank, which receives and stores the harvested crop after processing.

When performing a harvesting operation, the harvesting implement is positioned at a predetermined height above the field surface. Such positioning, in turn, permits a cutter bar mounted on the header to sever the crops present within the field from the associated stubble at a desired cutting height. As the harvester travels across the field to perform the harvesting operation, the contour or topography of the field may vary. In this respect, it may be necessary to adjust the position of the harvesting implement along multiple degrees of freedom throughout the harvesting operation to maintain the predetermined height above the field surface. As such, many harvesters include one or more dedicated actuators (e.g., a hydraulic cylinder(s)) to adjust the position of the harvesting implement along each degree of freedom. While such systems work well, further improvement are needed.

Accordingly, an improved system and method for adjusting the position of a harvesting implement of an agricultural harvester would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural harvester. The agricultural harvester includes a frame, a feeder coupled to the frame, and a harvesting implement coupled to the feeder. Furthermore, the agricultural harvester includes a first actuator including an extendible rod, with the first actuator coupled between one of the frame and the feeder or the feeder and the harvesting implement. Moreover, the agricultural harvester includes a second actuator including an extendible rod, with the second actuator coupled between the one of the frame and the feeder or the feeder and the harvesting implement such that an oblique angle is defined between the first and second actuators. In this respect, the rods of the first and second actuators are configured to be extended differing amounts such that harvesting implement is moved relative to the frame along two degrees of freedom.

In another aspect, the present subject matter is directed to a system for adjusting agricultural harvester implement position. The system includes a first actuator including an extendible rod, with the first actuator coupled between one of a frame of an agricultural harvester and a feeder of an agricultural harvester or the feeder and a harvesting implement of the agricultural harvester. In addition, the second includes a second actuator including an extendible rod, with the second actuator coupled between the one of the frame and the feeder or the feeder and the harvesting implement such that an oblique angle is defined between the first and second actuators. Furthermore, the system includes a computing system configured to control an operation of the first and second actuators such that the rods of the first and second actuators are extended differing amounts to move the harvesting implement relative to the frame along two degrees of freedom.

In a further aspect, the present subject matter is directed to a method for adjusting a position of a harvesting implement of an agricultural harvester. The agricultural harvester, in turn, includes a first actuator coupled between one of a frame of an agricultural harvester and a feeder of an agricultural harvester or the feeder and the harvesting implement. Additionally, the agricultural harvester further includes a second actuator coupled between the one of the frame and the feeder or the feeder and the harvesting implement such that an oblique angle is defined between the first and second actuators. The method includes receiving, with a computing system, an input indicative of a position of the harvesting implement relative to a field surface. Moreover, the method includes determining, with the computing system, an error associated with the position of the harvesting implement based on the received input. In addition, the method includes controlling, with the computing system, an operation of the first and second actuators based on the determined error such that rods of the first and second actuators are extended differing amounts to move the harvesting implement relative to the frame along two degrees of freedom.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
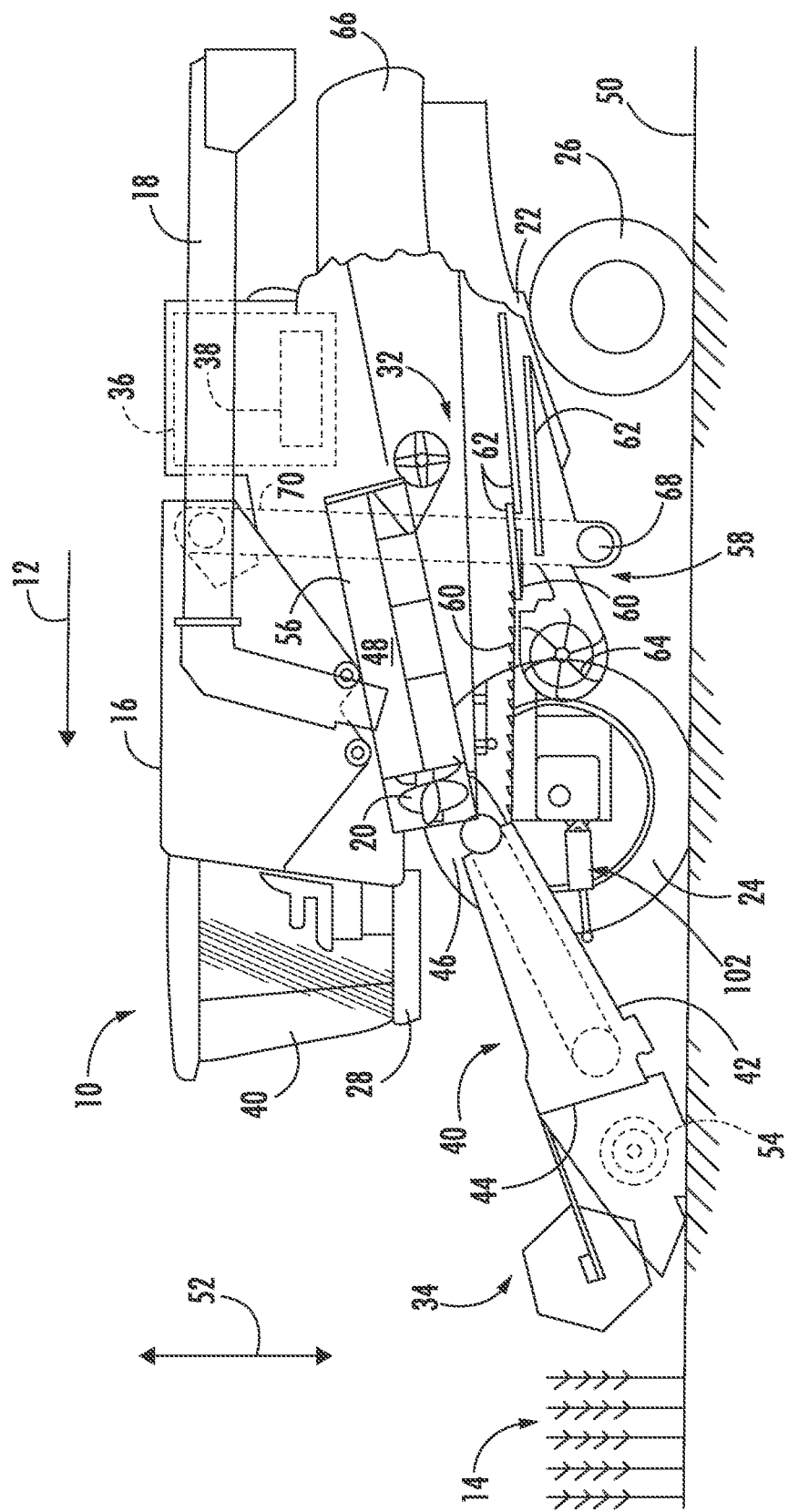
FIG. 1 illustrates a partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for adjusting the position of a harvesting implement of an agricultural harvester. As will be described below, the harvester may include a frame, a feeder coupled to the frame, and a harvesting implement (e.g., a header) coupled to the feeder. Furthermore, the harvester may include first and second actuators (e.g., fluid-driven actuators) positioned such that an oblique angle is defined therebetween. In some embodiments, the first and second actuators may both be coupled between the frame and the feeder. Conversely, in other embodiments, the first and second actuators may both be coupled between the feeder and the harvesting implement.

In several embodiments, the operation of the first and second actuators may be controlled such that the position of the harvesting implement is adjust along two degrees of freedom. More specifically, a computing system of the disclosed system may receive an input (e.g., sensor data) indicative of the position of the harvesting implement relative to the field surface. Additionally, the computing system may determine an error associated with the position of the harvesting implement based on the received input. Thereafter, the computing system may control the operation of the first and second actuators based on the determined error such that the rods of the first and second actuators are extended differing amounts, thereby moving the harvesting implement along two degrees of freedom. For example, when the first and second actuators are coupled between the frame and the feeder, the two degrees of freedom may be the position of the harvesting implement relative to the frame in the vertical direction and the roll angle of the harvesting implement. Conversely, when the first and second actuators are coupled between the feeder and the harvesting implement, the two degrees of freedom may be the roll and pitch angles of the harvesting implement.

Positioning the first and second actuators such that an oblique angle is defined therebetween improves the operation of the agricultural harvester when the rods of such actuators are extended differing amounts. More specifically, when the rods of a pair of parallel actuators are extended differing amounts, increased stresses are placed on the actuators and the associated mounts. For example, such movement generally results in increased rubbing or other frictional contact between components of the actuators (e.g., between the pistons and the associated cylinders when the actuators are hydraulic cylinders) and the mounts. However, by orienting the first and second actuators such that an oblique angle is defined therebetween, the rubbing/contact between the components of the actuators and the mounts when extending the rods differing amounts is reduced. This, in turn, improves accuracy of the adjustments being made by and reduces the wear incurred by these actuators and associated mounts (e.g., as there is less friction to overcome), thereby improving the operation of the agricultural harvester.

Referring now to the drawings, FIG. 1 illustrates a partial sectional side view of the agricultural harvester 10. In general, the harvester 10 may be configured to travel across a field in a forward direction of travel (indicated by arrow 12) to harvest a crop 14. While traversing the field, the harvester 10 may be configured to process and store the harvested crop within a crop tank 16 of the harvester 10. Furthermore, the harvested crop may be unloaded from the crop tank 16 for receipt by the crop receiving vehicle (not shown) via a crop discharge tube 18 of the harvester 10. Moreover, in the illustrated embodiment, the harvester 10 is configured as an axial-flow type combine in which the harvested crop is threshed and separated while being advanced by and along a longitudinally arranged rotor 20. However, in alternative embodiments, the harvester 10 may have any other suitable harvester configuration, such as a traverse-flow type configuration.

The harvester 10 may include a chassis or main frame 22 configured to support and/or couple to various components of the harvester 10. For example, in several embodiments, the harvester 10 may include a pair of driven, front wheels 24 and a pair of steerable, rear wheels 26 coupled to the frame 22. As such, the wheels 24, 26 may be configured to support the harvester 10 relative to the ground and move the harvester 10 in the forward direction of travel 12. Furthermore, the harvester 10 may include an operator's platform 28 having an operator's cab 30, a crop processing system 32, the crop tank 16, and the crop discharge tube 18 supported by the frame 22. As will be described below, the crop processing system 32 may be configured to perform various processing operations on the harvested crop as the crop processing system 32 transfers the harvested crop between a harvesting implement 34 (e.g., a header) of the harvester 10 and the crop tank 16. Furthermore, the harvester 10 may include an engine 36 and a transmission 38 mounted on the frame 22. The transmission 38 may be operably coupled to the engine 36 and may provide variably adjusted gear ratios for transferring engine power to the wheels 24 via a drive axle assembly (or via axles if multiple drive axles are employed).

Furthermore, as shown in FIG. 1, the harvester 10 includes a feeder 40 that couples to and supports the harvesting implement 34. More specifically, the feeder 40 may include a feeder housing 42 extending from the forward end 44 to an aft end 46. In this respect, the forward end 44 of the feeder housing 42 may, in turn, be coupled to the harvesting implement 34. Moreover, the aft end 46 of the feeder housing 42 may be pivotably coupled to the frame 22 adjacent to a threshing and separating assembly 48 of the crop processing system 32. Such a pivotable coupling may permit movement of the harvesting implement 34 relative to a field surface 50 and the frame 22 in a vertical direction (indicated by arrow 52). Additionally, as will be described below, the harvester 10 may include a plurality of actuators (one of which may include an actuator 102) configured to adjust the position of the harvesting implement 34 relative to the frame 22 and/or the field surface 50 along multiple degrees of freedom.

As the harvester 10 is propelled in the forward direction of travel 12 over the field with the crop 14, the crop material is severed from the stubble by one or more knives (not shown) positioned on the cutter bar 57 at the front of the harvesting implement 34. The crop material is delivered by a header auger 54 to the forward end 44 of the feeder housing 42, which supplies the harvested crop to the threshing and separating assembly 48. In general, the threshing and separating assembly 48 may include a cylindrical chamber 56 in which the rotor 20 is rotated to thresh and separate the harvested crop received therein. That is, the harvested crop is rubbed and beaten between the rotor 20 and the inner surfaces of the chamber 56 to loosen and separate the grain, seed, or the like from the straw.

The harvested crop separated by the threshing and separating assembly 48 may fall onto a crop cleaning assembly 58 of the crop processing system 32. In general, the crop cleaning assembly 58 may include a series of pans 60 and associated sieves 62. In general, the separated harvested crop may be spread out via the oscillation of pans 60 and/or sieves 62 and may eventually fall through apertures defined by the sieves 62. Additionally, a cleaning fan 64 may be positioned adjacent to one or more of the sieves 62 to provide an air flow through the sieves 62 that removes chaff and other impurities from the harvested crop. For instance, the fan 64 may blow the impurities off the harvested crop for discharge from the harvester 10 through the outlet of a straw hood 66 positioned at the back end of the harvester 10. The cleaned harvested crop passing through the sieves 62 may then fall into a trough of an auger 68, which may be configured to transfer the harvested crop to an elevator 70 for delivery to the crop tank 16.

Figure 2:
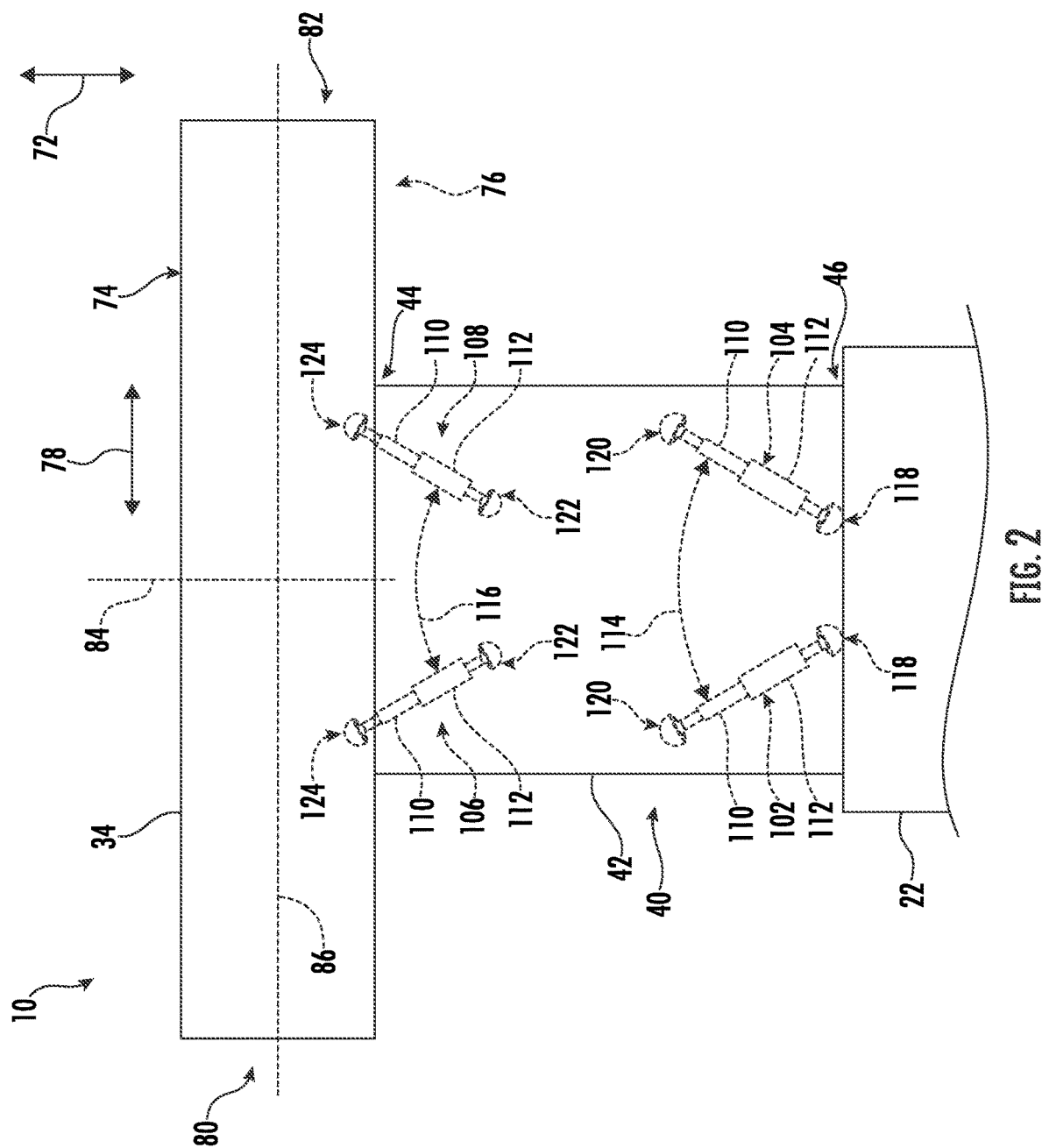
FIG. 2 illustrates a partial top view of the agricultural harvester shown in FIG. 1, particularly illustrating a feeder and a harvesting implement of the harvester in accordance with aspects of the present subject matter.

Referring now to FIG. 2, a partial top view of the agricultural harvester 10 is illustrated. As shown, the harvesting implement 34 extends along a longitudinal direction (indicated by arrow 72) between a forward end 74 of the harvesting implement 34 and an aft end 76 of the harvesting implement 34. The longitudinal direction 72, in turn, generally extends parallel to the direction of travel 12 of the harvester 10. Furthermore, as shown, the harvesting implement 34 extends along a transverse direction (indicated by arrow 78) between a first side 80 of the harvesting implement 34 and a second side 82 of the harvesting implement 34. The transverse direction 78, in turn, generally extends perpendicular to the direction of travel 12.

In several embodiments, the harvesting implement 34 may be adjustably coupled to the forward end 44 of the feeder housing 42. Specifically, in such embodiments, the harvesting implement 34 may be coupled to the feeder housing 42 such that a pitch angle of the harvesting implement 34 is adjustable. The pitch angle is, in turn, the angle defined between a longitudinal axis 84 of the harvesting implement 34 and the field surface 50. Thus, when the harvesting implement 34 is pitched, the forward and aft ends 74, 76 of the harvesting implement 34 are at different heights relative to the field surface 50. As such, when adjusting the pitch angle, the forward end 74 of the harvesting implement 34 may be raised or lowered relative to the feeder housing 42.

Moreover, the harvesting implement 34 may be coupled to the feeder housing 42 such that a roll angle of the harvesting implement 34 is adjustable. The roll angle is, in turn, the angle defined between a transverse axis 86 of the harvesting implement 34 and the field surface 50. As such, when adjusting the roll angle, the harvesting implement 34 may be rotated relative to the feeder housing 42 about the longitudinal axis 84. Thus, when the harvesting implement 34 is rolled, the first and second sides 80, 82 of the harvesting implement 34 are at different heights relative to the field surface 50.

Additionally, as mentioned above, the harvester 10 may include a plurality of actuators configured to adjust the position of the harvesting implement 34. More specifically, in the embodiment illustrated in FIG. 2, the harvester 10 includes a pair of actuators 102, 104 coupled between the frame 22 of the harvester 10 and the feeder housing 42 of the feeder 40. As will be described below, the actuators 102, 104 may be configured to adjust the position of the harvesting implement 34 along two degrees of freedom, namely its position along the vertical direction 52 and its roll angle. Furthermore, in the illustrated embodiment, the harvester 10 includes a pair of actuators 106, 108 coupled between the feeder housing 42 of the feeder 40 and the harvesting implement 34. As will be described below, the actuators 106, 108 may be configured to adjust the position of the harvesting implement 34 along two degrees of freedom, namely its roll and pitch angles. However, in alternative embodiments, the harvester 10 may include any other suitable number of actuators, such as only the pair of actuators 102, 104 or only the pair of actuators 106, 108.

The actuators 102, 104, 106, 108 may correspond to any suitable type of actuator. For example, in several embodiments, the actuators 102, 104, 106, 108 may be configured as fluid-driven actuators (e.g., hydraulic or pneumatic cylinder). In such embodiments, each actuator 102, 104, 106, 108 may include an extendible rod 110 and an associated cylinder 112. As such, the rods 110 of the actuators 102, 104, 106, 108 may be extended and/or retracted relative to the corresponding cylinders 112 to adjust the position of the harvesting implement 34 along the associated degrees of freedom. However, in alternative embodiments, the actuators 102, 104, 106, 108 may correspond to any suitable type of actuator having extendible rods, such as electric linear actuators.

Furthermore, in several embodiments, the pair of actuators 102, 104 and the pair of actuators 106, 108 are oriented in a non-parallel manner. Specifically, as shown, the actuators 102, 104 are coupled between the frame 22 and the feeder 40 such that an oblique angle (indicated by dashed arrow 114) is defined therebetween. Thus, the longitudinal or longest axes (not shown) of the actuators 102, 104 may define the oblique angle 114 therebetween. In one embodiment, the actuators 102, 104 may be oriented such that the corresponding rods 110 are configured to extend away from each other. Moreover, as shown, the actuators 106, 108 are coupled between the feeder 40 and the harvesting implement 34 such that an oblique angle (indicated by dashed arrow 116) is defined therebetween. Thus, the longitudinal or longest axes (not shown) of the actuators 106, 108 may define the oblique angle 116 therebetween. In one embodiment, the actuators 102, 104 may be oriented such that the corresponding rods 110 are configured to extend away from each other.

Additionally, the rods 110 of the actuators 102, 104, 106, 108 may be configured to be extended differing amounts. In this respect, as will be described below, extending the rods 110 of the actuators 102, 104 differing amounts allows the actuators 102, 104 to simultaneously adjust the position of the harvesting implement 34 along two degrees of freedom. Similarly, extending the rods 110 of the actuators 106, 108 differing amounts allows the actuators 106, 108 to simultaneously adjust the position of the harvesting implement 34 along two degrees of freedom.

As mentioned above, the rods 110 of the actuators 102, 104 may be configured to be extended differing amounts relative to the corresponding cylinders 112. This, in turn, allows the actuators 102, 104 to adjust the position of the harvesting implement 34 relative to the frame 22 and/or the field surface 50 along two degrees of freedom, namely its position along the vertical direction 52 and its roll angle. For example, by extending the rod 110 of the actuator 102 farther than the rod 110 of the actuator 104, the harvesting implement 34 can be simultaneously raised relative to the field surface 50 and rolled to the right (i.e., such that the first side 80 of the harvesting implement 34 is higher than the second side 82 of the harvesting implement 34 relative to the field surface 50). Conversely, by extending the rod 110 of the actuator 104 farther than the rod 110 of the actuator 102, the harvesting implement 34 can be simultaneously raised relative to the field surface 50 and rolled to the left (i.e., such that the second side 82 of the harvesting implement 34 is higher than the first side 80 of the harvesting implement 34 relative to the field surface 50).

Moreover, as mentioned above, the rods 110 of the actuators 106, 108 may be configured to be extended differing amounts relative to the corresponding cylinders 112. This, in turn, allows the actuators 106, 108 to adjust the position of the harvesting implement 34 relative to the frame 22 and/or the field surface 50 along two degrees of freedom, namely its roll and pitch angles. For example, by extending the rod 110 of the actuator 106 farther than the rod 110 of the actuator 108, the harvesting implement 34 can be rolled to the right (i.e., such that the first side 80 of the harvesting implement 34 is higher than the second side 82 of the harvesting implement 34 relative to the field surface 50) and pitched forward (i.e., such that the forward end 74 of the harvesting implement 34 is closer to the field surface 50 than the aft end 76 of the harvesting implement 34). Conversely, by extending the rod 110 of the actuator 108 farther than the rod 110 of the actuator 106, the harvesting implement 34 can be rolled to the left (i.e., such that the second side 82 of the harvesting implement 34 is higher than the first side 80 of the harvesting implement 34 relative to the field surface 50) and pitched forward (i.e., such that the forward end 74 of the harvesting implement 34 is closer to the field surface 50 than the aft end 76 of the harvesting implement 34).

As mentioned above, the actuators 102, 104 define the oblique angle 114 therebetween and the actuators 102, 104 define the oblique angle 116 therebetween. Such relative positioning of the actuators 102, 104, 106, 108 improves the operation of the harvester 10 when the rods 110 of such actuators 102, 104, 106, 108 are extended differing amounts. More specifically, when the rods of a pair of parallel actuators are extended differing amounts, increased stresses are placed on the actuators and the associated mounts. For example, such movement generally results in increased rubbing or other frictional contact between components of the actuators (e.g., between the pistons and the associated cylinders when the actuators are hydraulic cylinders) and the mounts. However, by orienting the actuators 102, 104 such that the oblique angle 114 is defined therebetween and the actuators 106, 108 such that the oblique angle 116 is defined therebetween, the rubbing/frictional contact between the components of the actuators 102, 104, 106, 108 and the associated mounts when extending the rods 110 differing amounts is reduced. This, in turn, improves accuracy of the adjustments being made by and reduces the wear incurred by these actuators 102, 104, 106, 108 and associated mounts (e.g., as there is less friction to overcome), thereby improving the operation of the harvester 10.

Additionally, in several embodiments, the actuators 102, 104, 106, 108 may be coupled to the corresponding components of the harvester 10 via adjustable joints to further accommodate the differing extensions of the rods 110. For example, in the illustrated embodiment, the cylinders 112 of the actuators 102, 104 are coupled to the frame 22 via ball joints 118 and the rods 110 of the actuators 102, 104 are coupled to the feeder housing 42 via ball joints 120. Moreover, in the illustrated embodiment, the cylinders 112 of the actuators 106, 108 are coupled to the feeder housing 42 via ball joints 122 and the rods 110 of the actuators 106, 108 are coupled to the harvesting implement 34 via ball joints 124. The ball joints 118, 120, 122, 124 further reduce rubbing and other frictional contact associated with the actuators 102, 104, 106, 108 when the rods 110 are extending differing amounts (in addition the relative positioning of the actuators 102, 104, 106, 108 such that the oblique angles 114, 116 are respectively defined therebetween). However, in alternative embodiments, the actuators 102, 104, 106, 108 may be coupled to the corresponding components of the harvester 10 via any other suitable type of adjustable joints, such as via gimbals. Furthermore, in other embodiments, the rods 110 of the actuators 102, 104 may be coupled to the frame 22 and the cylinders 112 of the actuators 102, 104 may be coupled to the feeder housing 42. Moreover, in other embodiments, the rods 110 of the actuators 106, 108 may be coupled to the feeder housing 42 and the cylinders 112 of the actuators 106, 108 may be coupled to the harvesting implement 34.

It should be further appreciated that the configuration of the agricultural harvester 10 described above and shown in FIGS. 1 and 2 is provided only to place the present subject matter in an exemplary field of use. Thus, it should be appreciated that the present subject matter may be readily adaptable to any manner of harvester configuration.

Figure 3:
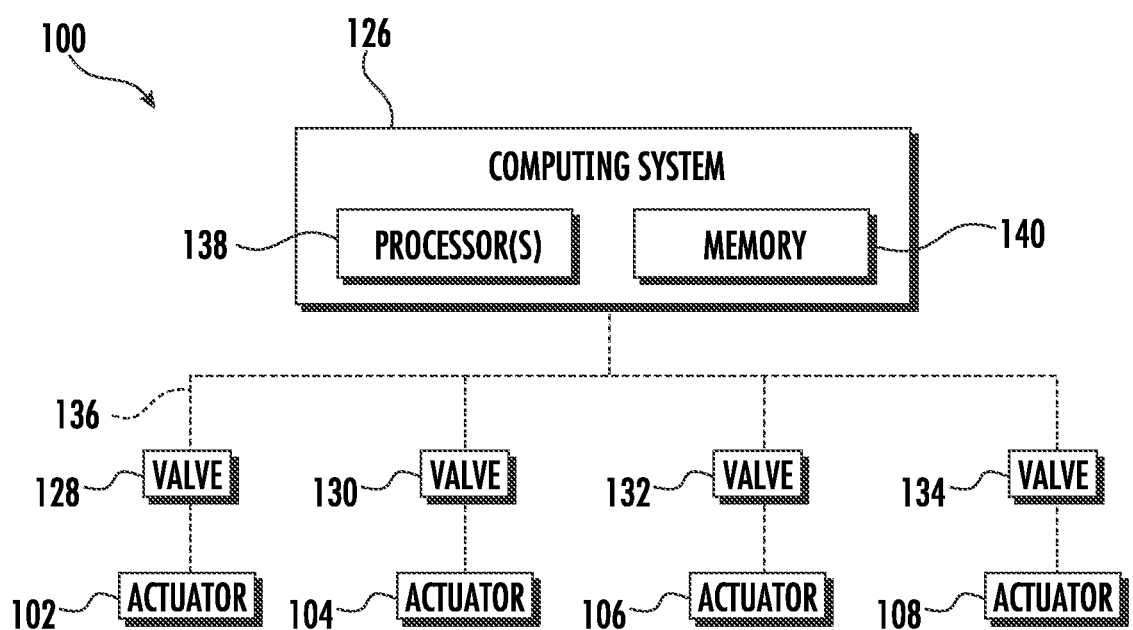
FIG. 3 illustrates a schematic view of one embodiment of a system for adjusting the position of a harvesting implement of an agricultural harvester in accordance with aspects of the present subject matter.

Referring now to FIG. 3, a schematic view of one embodiment of a system 100 for adjusting the position of a harvesting implement of an agricultural harvester is illustrated in accordance with aspects of the present subject matter. In general, the system 100 will be described herein with reference to the agricultural harvester 10 described above with reference to FIGS. 1 and 2. However, it should be appreciated by those of ordinary skill in the art that the disclosed system 100 may generally be utilized with agricultural harvesters having any other suitable harvester configuration.

As shown in FIG. 3, the system 100 may include a computing system 126 communicatively coupled to one or more components of the harvester 10 and/or the system 100 to allow the operation of such components to be electronically or automatically controlled by the computing system 126. In several embodiments, the computing system 126 may be configured to control the operation of the actuators 102, 104, 106, 108. For example, the computing system 126 may be communicatively coupled to valves 128, 130, 132, 134 via a communicative link 136. The valves 128, 130, 132, 134 may, in turn, be configured to control the flow of fluid to and/or from the actuators 102, 104, 106, 108, respectively. As such, by independently controlling the operation of the valves 128, 130, the computing system 126 can control the operation of the actuators 102, 104 such that the rods 110 of these actuators 102, 104 are extended differing amounts relative to the corresponding cylinders 112. Similarly, by independently controlling the operation of the valves 132, 134, the computing system 126 can control the operation of the actuators 106, 108 such that the rods 110 of these actuators 106, 108 are extended differing amounts relative to the corresponding cylinders 112. Alternatively, in embodiments where the actuators 102, 104, 104, 106 are configured as electric linear actuators, the computing system 126 may be directly communicatively coupled to such actuators 102, 104, 106, 108. In such embodiments, the computing system 126 may be configured to directly control the operation of the actuators 102, 104, 104, 106. In addition, the computing system 126 may be communicatively coupled to any other suitable components of the harvester 10 and/or the system 100.

In general, the computing system 126 may comprise one or more processor-based devices, such as a given controller or computing device or any suitable combination of controllers or computing devices. Thus, in several embodiments, the computing system 126 may include one or more processor(s) 138 and associated memory device(s) 140 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 140 of the computing system 126 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 140 may generally be configured to store suitable computer-readable instructions that, when implemented by the processor(s) 138, configure the computing system 126 to perform various computer-implemented functions, such as one or more aspects of the methods and algorithms that will be described herein. In addition, the computing system 126 may also include various other suitable components, such as a communications circuit or module, one or more input/output channels, a data/control bus and/or the like.

The various functions of the computing system 126 may be performed by a single processor-based device or may be distributed across any number of processor-based devices, in which instance such devices may be considered to form part of the computing system 126. For instance, the functions of the computing system 126 may be distributed across multiple application-specific controllers or computing devices, such as a navigation controller, an engine controller, a transmission controller, and/or the like.

Figure 4:
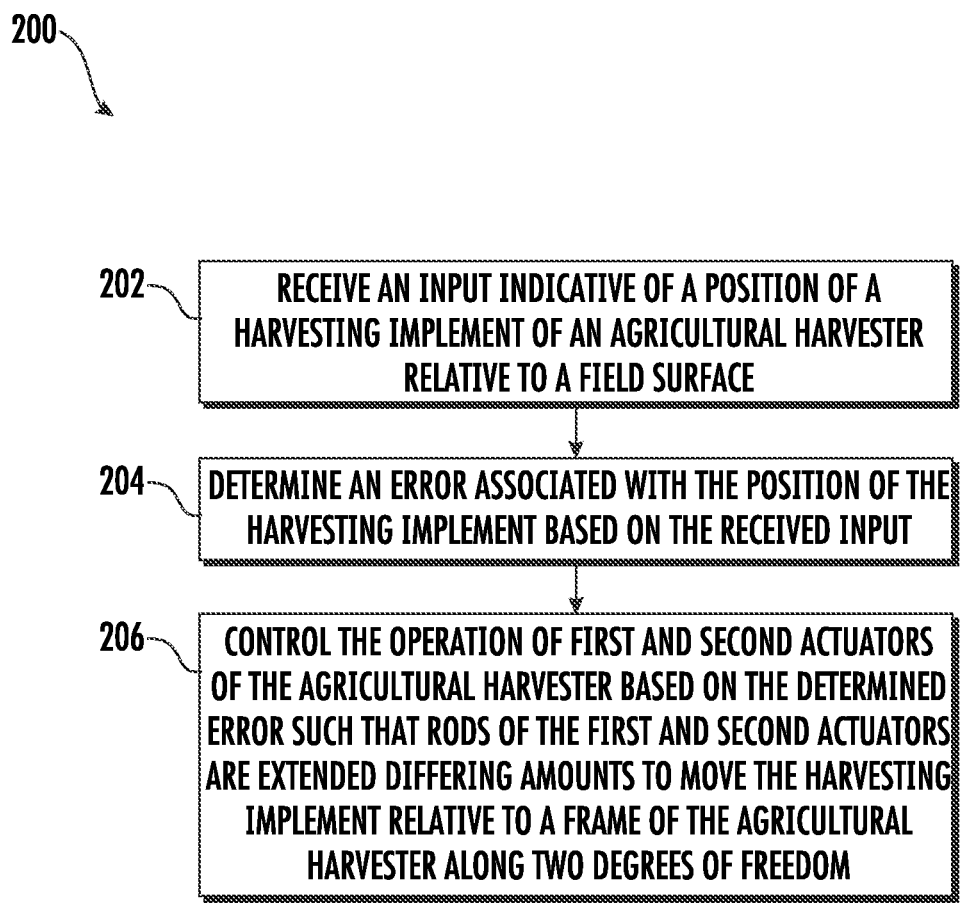
FIG. 4 illustrates a flow diagram of one embodiment of a method for adjusting the position of a harvesting implement of an agricultural harvester in accordance with aspects of the present subject matter.

Referring now to FIG. 4, a flow diagram of one embodiment of a method 200 for adjusting the position of a harvesting implement of an agricultural harvester is illustrated in accordance with aspects of the present subject matter. In general, the method 200 will be described herein with reference to the agricultural harvester 10 and the system 100 described above with reference to FIGS. 1-3. However, it should be appreciated by those of ordinary skill in the art that the disclosed method 200 may generally be implemented with any agricultural harvester having any suitable harvester configuration and/or within any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 includes receiving, with a computing system, an input indicative of the position of a harvesting implement of an agricultural harvester relative to a field surface. In several embodiments, the computing system 126 may receive one or more inputs indicative of the position of the harvesting implement 34 of the harvester 10 relative to the field surface 50. For example, the computing system 126 may receive such input(s) from one or more sensors (not shown) that capture data indicative of the distance between the harvesting implement 34 and the field surface.

Additionally, at (204), the method 200 includes determining, with the computing system, an error associated with the position of the harvesting implement based on the received input. In several embodiments, the computing system 126 may determine an error associated with the position of the harvesting implement 34 based on the received input (e.g., the input received at (202)). For example, the computing system 126 may determine the current position of the harvesting implement 34 relative to the field surface 50 based on the received input. Thereafter, the computing system 126 may compare the determined current position to a selected or desired position for the harvesting implement 34. The difference between these two positions may, in turn, be the error.

Moreover, as shown in FIG. 5, at (206), the method 200 includes controlling, with the computing system, the operation of first and second actuators of the agricultural harvester based on the determined error such that rods of the first and second actuators are extended differing amounts to move the harvesting implement relative to a frame of the agricultural harvester along two degrees of freedom. In several embodiments, the computing system 126 may control the operation of the valves 128, 130, 132, 134 based on the determined error (e.g., the error determined at (204)) such that the rods 110 of the actuators 102, 104 are extended differing amounts and/or the rods 110 of the actuators 106, 108 are extended differing amounts. As mentioned above, extending the rods 110 differing amount allows the position of the harvesting implement 34 to be simultaneously along multiple degrees of freedom.

For example, in certain instances, it may be necessary to adjust both the position of the harvesting implement 34 along the vertical direction 52 and the roll angle of the harvesting implement 34 based on the determined error. In such instances, the computing system 126 may transmit control signals to the valves 128, 130 via the communicative link 136. The control signals may, in turn, instruct the valves 128, 130 to operate independently of each other such that the rods 110 of the actuators 102, 104 are extended differing amounts. As described above, extending the rods 110 of the actuators 102, 104 differing amounts simultaneously adjusts the position of the harvesting implement 34 along the vertical direction 52 and the roll angle of the harvesting implement 34.

Additionally, in certain instances, it may be necessary to adjust both the roll and pitch angles of the harvesting implement 34 based on the determined error. In such instances, the computing system 126 may transmit control signals to the valves 132, 134 via the communicative link 136. The control signals may, in turn, instruct the valves 132, 134 to operate independently of each other such that the rods 110 of the actuators 106, 108 are extended differing amounts. As described above, by extending the rods 110 of the actuators 106, 108 differing amounts simultaneously adjusts the roll and pitch angles of the harvesting implement 34.

It is to be understood that the steps of the method 200 are performed by the computing system 126 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 126 described herein, such as the method 200, is implemented in software code or instructions which are tangibly stored on a tangible computer readable medium. The computing system 126 loads the software code or instructions via a direct interface with the computer readable medium or via a wired and/or wireless network. Upon loading and executing such software code or instructions by the computing system 126, the computing system 126 may perform any of the functionality of the computing system 126 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural harvester, comprising:
a frame;
a feeder coupled to the frame;
a harvesting implement coupled to the feeder;
a first actuator including an extendible rod, the first actuator coupled between one of the frame and the feeder or the feeder and the harvesting implement;
a second actuator including an extendible rod, the second actuator coupled between the one of the frame and the feeder or the feeder and the harvesting implement such that an oblique angle is defined between the first and second actuators
a third actuator including an extendible rod, the third actuator coupled between the other of the frame and the feeder or the feeder and the harvesting implement; and
a fourth actuator including an extendible rod, the fourth actuator coupled between the other of the frame and the feeder or the feeder and the harvesting implement such that an oblique angle is defined between the third and fourth actuators,
wherein the rods of the first and second actuators are configured to be extended differing amounts such that harvesting implement is moved relative to the frame along two degrees of freedom, and
wherein the rods of the third and fourth actuators are configured to be extended differing amounts such that harvesting implement is moved relative to the frame along two degrees of freedom.

2. The agricultural harvester of claim 1, wherein the first and second actuators are coupled between the frame and the feeder.

3. The agricultural harvester of claim 2, wherein the two degrees of freedom comprise a position of the harvesting implement relative to the frame in a vertical direction and a roll angle of the harvesting implement.

4. The agricultural harvester of claim 1, wherein the first and second actuators are coupled between the feeder and the harvesting implement.

5. The agricultural harvester of claim 4, wherein the two degrees of freedom comprise a roll angle of the harvesting implement and a pitch angle of the harvesting implement.

6. The agricultural harvester of claim 1, wherein the first and second actuators comprise fluid-driven actuators such that the rods of the first and second actuators are configured to be extended relative to corresponding cylinders.

7. The agricultural harvester of claim 1, wherein the rods of the first and second actuators are configured to be extended away from each other.

8. The agricultural harvester of claim 1, wherein the first and second actuators are coupled to the one of the frame and the feeder or the feeder and the harvesting implement via ball joints.

9. A system for adjusting agricultural harvester implement position, the system comprising:
a first actuator including an extendible rod, the first actuator coupled between one of a frame of an agricultural harvester and a feeder of an agricultural harvester or the feeder and a harvesting implement of the agricultural harvester;
a second actuator including an extendible rod, the second actuator coupled between the one of the frame and the feeder or the feeder and the harvesting implement such that an oblique angle is defined between the first and second actuators;
a third actuator including an extendible rod, the third actuator coupled between the other of the frame and the feeder or the feeder and the harvesting implement;
a fourth actuator including an extendible rod, the fourth actuator coupled between the other of the frame and the feeder or the feeder and the harvesting implement such that an oblique angle is defined between the third and fourth actuators; and
a computing system configured to control an operation of the first and second actuators such that the rods of the first and second actuators are extended differing amounts to move the harvesting implement relative to the frame along two degrees of freedom, the computing system further configured to control an operation of the third and fourth such that the rods of the third and fourth actuators are extended differing amounts to move the harvesting implement relative to the frame along two degrees of freedom.

10. The system of claim 9, wherein the first and second actuators are coupled between the frame and the feeder.

11. The system of claim 10, wherein the two degrees of freedom comprise a position of the harvesting implement relative to the frame in a vertical direction and a roll angle of the harvesting implement.

12. The system of claim 9, wherein the first and second actuators are coupled between the feeder and the harvesting implement.

13. The system of claim 12, wherein the two degrees of freedom comprise a roll angle of the harvesting implement and a pitch angle of the harvesting implement.

14. The system of claim 9, wherein the first and second actuators comprise fluid-driven actuators such that the rods of the first and second actuators are configured to be extended relative to corresponding cylinders.

15. The system of claim 9, wherein the rods of the first and second actuators are configured to be extended away from each other.

16. A method for adjusting a position of a harvesting implement of an agricultural harvester, the agricultural harvester including a first actuator coupled between one of a frame of an agricultural harvester and a feeder of an agricultural harvester or the feeder and the harvesting implement, the agricultural harvester further including a second actuator coupled between the one of the frame and the feeder or the feeder and the harvesting implement such that an oblique angle is defined between the first and second actuators, the agricultural harvester further including a third actuator including an extendible rod, the third actuator coupled between the other of the frame and the feeder or the feeder and the harvesting implement, the agricultural harvester further including a fourth actuator including an extendible rod, the fourth actuator coupled between the other of the frame and the feeder or the feeder and the harvesting implement such that an oblique angle is defined between the third and fourth actuators, the method comprising:

receiving, with a computing system, an input indicative of a position of the harvesting implement relative to a field surface;

determining, with the computing system, an error associated with the position of the harvesting implement based on the received input;

controlling, with the computing system, an operation of the first and second actuators based on the determined error such that rods of the first and second actuators are extended differing amounts to move the harvesting implement relative to the frame along two degrees of freedom; and controlling, with the computing system, an operation of the third and fourth actuators based on the determined error such that rods of the third and fourth actuators are extended differing amounts to move the harvesting implement relative to the frame along two degrees of freedom.

17. The method of claim 16, wherein the two degrees of freedom comprise a position of the harvesting implement relative to the frame in a vertical direction and a roll angle of the harvesting implement.

18. The method of claim 16, wherein the two degrees of freedom comprise a roll angle of the harvesting implement and a pitch angle of the harvesting implement.

\* \* \* \* \*